C. C. FAIRLAMB.
Milk-Can.

No. 222,988. Patented Dec. 30, 1879.

Attest:
Geo. T. Smallwood Jr.
Walter Allen

Inventor:
Charles C. Fairlamb.
By Knight Bros attys

UNITED STATES PATENT OFFICE.

CHARLES C. FAIRLAMB, OF ARENA, WISCONSIN.

IMPROVEMENT IN MILK-CANS.

Specification forming part of Letters Patent No. 222,988, dated December 30, 1879; application filed May 26, 1879.

*To all whom it may concern:*

Be it known that I, CHARLES C. FAIRLAMB, of Arena, in the county of Iowa and State of Wisconsin, have invented new and useful Improvements in Cans for Transporting and Storing Cream and other Liquids, of which the following is a specification.

The subject of my invention is a can with straight vertical sides, a hollow follower-head fitting its interior, and a filling-tube by which the cream or other liquid is introduced beneath the follower-head, so as to raise the latter by its pressure.

In order that my invention may be fully understood, I will proceed to describe it with reference to the accompanying drawings, in which—

Figure 1:
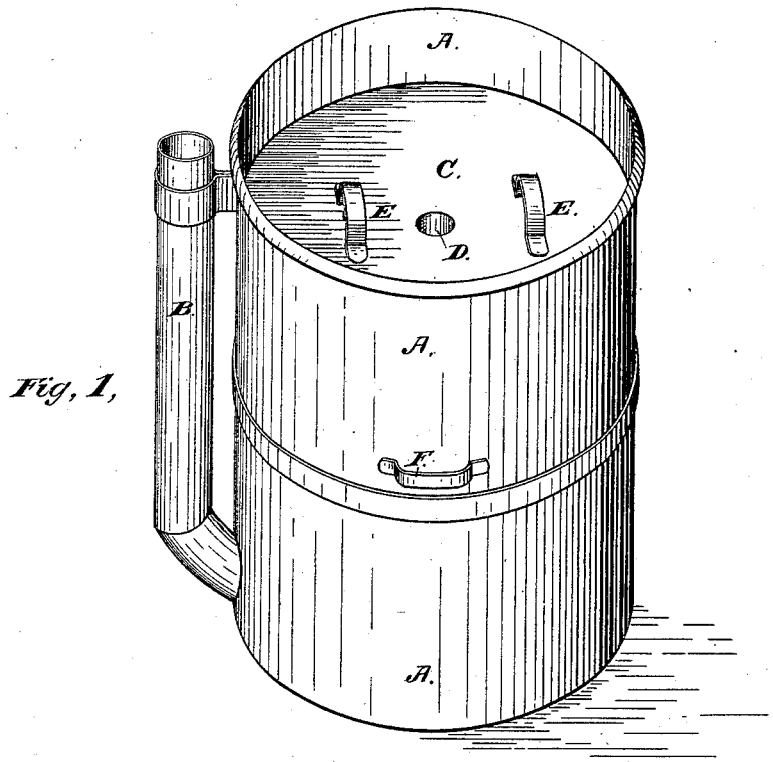
Figure 2:
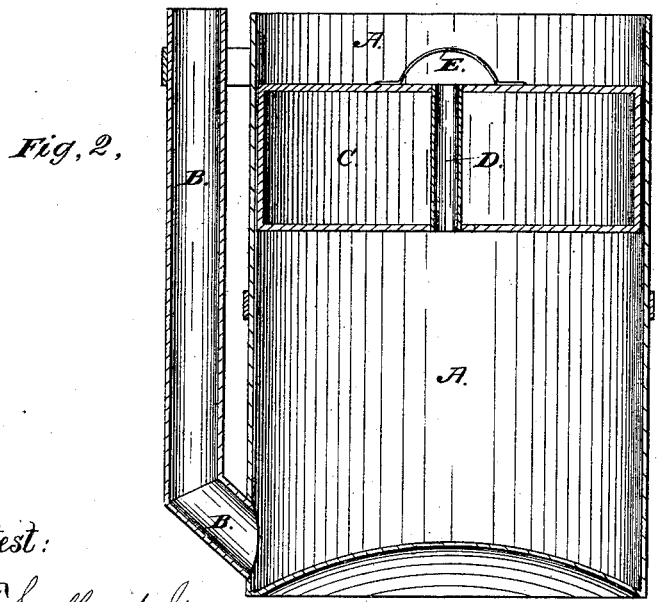

Figure 1 is a perspective view of a can, illustrating my invention. Fig. 2 is a vertical longitudinal section of the same.

A represents a can of cylindrical shape; B, a vertical tube connecting with the bottom of the can for filling. C is a hollow cover fitting within the can A, and adapted to float upon the cream or milk or other liquid therein. An aperture or tube, D, passing through the center of the cover, prevents the imprisonment of air below it. E E represent the handles for raising the cover. F F are handles for carrying the can.

My invention possesses important advantages, especially for the purposes of storing and transporting cream. It effects a saving in labor and in cream by filling through the pipe B, permitting the cream to run down into the can at bottom and force up the follower-head as fast as cream is added. This dispenses with the common practice of removing the follower-head from the can and pouring the cream in at the top, which involves considerable trouble, and also loss of cream, which drops from the cover. The old practice is also uncleanly, by the spilling of cream and permitting dust and dirt to enter the can.

Having thus described my invention, the following is what I claim as new therein, and desire to secure by Letters Patent:

A portable cylindrical can provided with a floating head or follower, C, having an aperture, D, and with a filling-tube, B, extending upward alongside of the can, substantially as herein set forth, so that the follower-head will be raised by the pressure of cream taken in at the bottom of the can.

CHAS. C. FAIRLAMB.

Witnesses:
S. S. POWERS,
F. W. MCCLELLAND.